US012013755B2

(12) United States Patent
Golvalkar

(10) Patent No.: US 12,013,755 B2
(45) Date of Patent: Jun. 18, 2024

(54) METHOD AND DEVICE FOR ASSESSING OPERATIONAL EFFECTIVENESS OF SOLID-STATE DRIVE (SSD) MEMORY DEVICE

(71) Applicant: Kioxia Corporation, Tokyo (JP)

(72) Inventor: Pradeep Golvalkar, Bangalore (IN)

(73) Assignee: Kioxia Corporation, Tokyo (JP)

( * ) Notice: Subject to any disclaimer, the term of this patent is extended or adjusted under 35 U.S.C. 154(b) by 13 days.

(21) Appl. No.: 17/941,321

(22) Filed: Sep. 9, 2022

(65) Prior Publication Data

US 2023/0325275 A1 Oct. 12, 2023

(30) Foreign Application Priority Data

Apr. 7, 2022 (IN) .............................. 202241020833

(51) Int. Cl.
*G06F 11/10* (2006.01)
*G06F 11/14* (2006.01)

(52) U.S. Cl.
CPC ...... *G06F 11/1068* (2013.01); *G06F 11/1438* (2013.01); *G06F 11/1469* (2013.01)

(58) Field of Classification Search
None
See application file for complete search history.

(56) References Cited

U.S. PATENT DOCUMENTS

| | | | | |
|---|---|---|---|---|
| 7,873,885 B1* | 1/2011 | Shin | ........................ | G11C 29/08 |
| | | | | 714/724 |
| 9,176,813 B2* | 11/2015 | Guo | ..................... | G06F 11/1666 |
| 2010/0082890 A1* | 4/2010 | Heo | ..................... | G06F 12/0246 |
| | | | | 711/E12.001 |
| 2014/0173268 A1* | 6/2014 | Hashimoto | ............ | G11C 29/52 |
| | | | | 713/2 |
| 2014/0181595 A1* | 6/2014 | Hoang | ................ | G06F 11/3034 |
| | | | | 714/47.3 |
| 2015/0033065 A1* | 1/2015 | Canepa | ............... | G06F 11/1008 |
| | | | | 714/6.11 |
| 2015/0046625 A1* | 2/2015 | Peddle | ............... | G11C 14/0018 |
| | | | | 710/308 |
| 2019/0172537 A1* | 6/2019 | Peddle | ................ | G06F 12/0246 |
| 2020/0371702 A1* | 11/2020 | Cariello | ................ | G06F 3/0604 |

OTHER PUBLICATIONS

Y. Cai, S. Ghose, E. F. Haratsch, Y. Luo and O. Mutlu, "Error Characterization, Mitigation, and Recovery in Flash-Memory-Based Solid-State Drives," in Proceedings of the IEEE, vol. 105, No. 9, pp. 1666-1704, Sep. 2017, doi: 10.1109/JPROC.2017.2713127. (Year: 2017).*

* cited by examiner

*Primary Examiner* — Daniel F. McMahon
(74) *Attorney, Agent, or Firm* — Maier & Maier, PLLC

(57) ABSTRACT

A method, and a Solid-State Drive (SSD) memory device and a system for assessing operational effectiveness of the SSD is provided. Upon a failure of the SSD memory device, a command is executed which is received from a host device. The SSD memory device switches to an operational state after executing the command. A data structure having SSD operational parameters is obtained from a plurality of data structures obtained before the failure and stored in a Read Only Memory (ROM) upon the SSD memory device switching to the operational state. The obtained data structure is restored into a Random-Access Memory (RAM).

15 Claims, 5 Drawing Sheets

METHOD AND DEVICE FOR ASSESSING OPERATIONAL EFFECTIVENESS OF SOLID-STATE DRIVE (SSD) MEMORY DEVICE

CROSS-REFERENCE TO RELATED APPLICATIONS

This application is based upon and claims the benefit of priority from Indian Patent Application No. 202241020833, filed Apr. 7, 2022, the entire contents of which are incorporated herein by reference.

FIELD

Present disclosure relates, in general to a solid-state drive (SSD) memory device, and more particularly, but not exclusively to method and device for assessing operational effectiveness of the solid-state drive (SSD) memory device.

BACKGROUND

Generally, a memory device such as a solid-state drive (SSD) memory device is preferred in faster and efficient storage systems. The memory device can be used as integral or standalone part in many computing devices/computing applications. Typically, a new memory device undergoes a testing (verification)/validation/qualification phase before it is launched in the market. The main purpose of the testing/validation/qualification phase in the product development process is to validate quality and performance of the memory device.

During the testing/validation/qualification phase, the memory device encounters failure due to various firmware errors/issues. In existing validation systems, when the memory device encounters the failure due to firmware errors, Root Point Clear (RPC) command is issued to reset the memory device back to its first boot state. By this approach, important information like Program-Erase (P/E) cycles, statistics information related to the memory device, grown defect block information, and the like is lost. Consider a scenario where the memory device switches to operational state after the RPC command is issued. The testing can be performed again on the recovered memory device (after failure of the memory device due to firmware error). Although the recovered memory device can be tested again, data and analysis from the previous testing is lost. Parameters such as P/E cycle information are essential and are captured over long period of testing. Further, the memory device appears fresh, though NAND cells associated with the memory device are worn out. The firmware uses P/E cycle information to perform many NAND cells mitigations/counter measures, which may go wrong after the RPC. As grown bad block information is lost, in the next run after the RPC, firmware may still access the grown bad blocks resulting in new errors. Statistics information which is critical for validation is also lost after the RPC command is issued. Generally, tests run for multiple weeks/months before failure, and recovering such memory device along with vital information such as P/E Cycle, grown bad block information is important to further testing and to save testing time and resources. In existing approaches, the recovered memory device must be re-tested from beginning which will consume additional time. Further, it is not possible to recover memory device along with the vital information, which results in difficulty to assess operational effectiveness of the memory device. Thus, the validation of the memory devices is inaccurate due to the problems occurred in the existing testing/validation approaches.

In view of the above, there is a need of a system which restores the vital information after failure of the memory device. This enables to save re-test time and avoid wastage of memory device.

The information disclosed in this background of the disclosure section is only for enhancement of understanding of the general background of the invention and should not be taken as an acknowledgment or any form of suggestion that this information forms the prior art already known to a person skilled in the art.

BRIEF DESCRIPTION OF THE DRAWING

The novel features and characteristic of the disclosure are set forth in the appended claims. The disclosure itself, however, as well as a preferred mode of use, further objectives, and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

Figure 1:
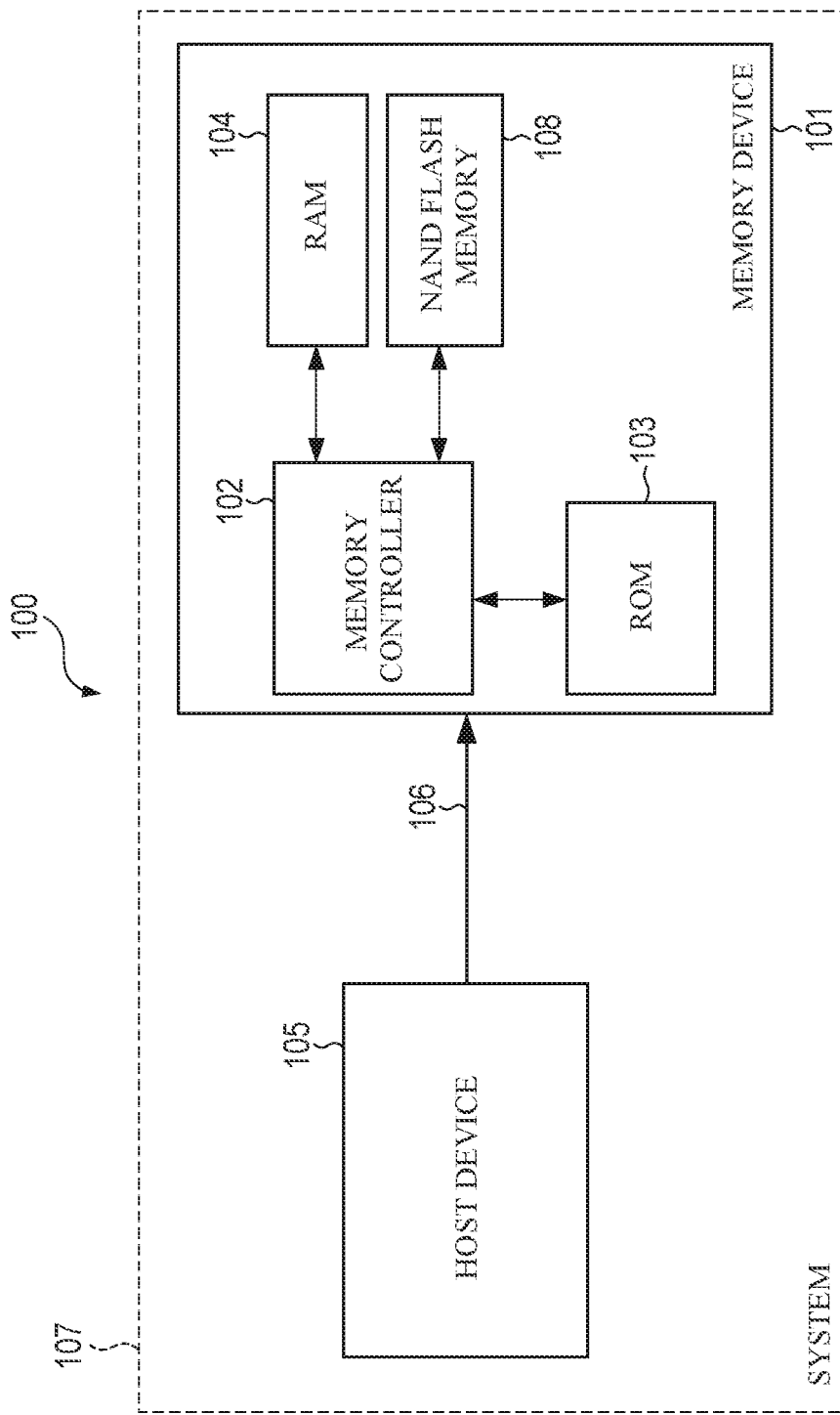
FIG. 1 shows an exemplary environment of a system for assessing operational effectiveness of a solid-state drive (SSD) memory device, in accordance with some embodiments of the present disclosure.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or memory controller, whether or not such computer or memory controller is explicitly shown.

DETAILED DESCRIPTION

In an embodiment, the present disclosure relates a method for assessing operational effectiveness of a solid-state drive (SSD) memory device. The method is performed by the solid-state drive (SSD) memory device. Upon a failure of the solid-state drive (SSD) memory device, the method comprises executing a command received from a host device. The SSD memory device switches to an operational state after executing the command. Upon switching to the operational state, the method comprises obtaining a data structure having SSD operational parameters from a plurality of data structures obtained before the failure and stored in a Read Only Memory (ROM) associated with the SSD memory device. The method further comprises restoring the obtained data structure into a Random Access Memory (RAM) associated with the SSD memory device for assessing operational effectiveness of the SSD memory device based on the restored data structure.

In an embodiment, the present disclosure relates to a solid-state drive (SSD) memory device. The solid-state drive (SSD) memory device comprises a memory controller, a Read Only Memory (ROM), and a Random Access Memory (RAM). Upon a failure of the solid-state drive (SSD) memory device, the memory controller is configured to execute a command received from a host device. The SSD memory device switches to an operational state after executing the command. Upon switching to the operational stat, the memory controller is configured to obtain a data structure having SSD operational parameters from a plurality of data structures obtained before the failure and stored in the Read Only Memory (ROM). The memory controller is further configured to restore the obtained data structure into the Random-Access Memory (RAM) for assessing operational effectiveness of the SSD memory device based on the restored data structure.

In an embodiment, the present disclosure relates to a system for assessing operational effectiveness of a solid-state drive (SSD) memory device. The system comprises the solid-state drive (SSD) memory device and a host device. Upon a failure of the SSD memory device, the host device is configured to send a command to the SSD memory device. The SSD memory device is configured to execute the command received from the host device. The SSD memory device switches to an operational state after executing the command. Upon switching to the operational state, the SSD memory device is configured to obtain a data structure having SSD operational parameters from a plurality of data structures obtained from the failure and stored in a Read Only Memory (ROM) associated with the SSD memory device. The SSD memory device is further configured to restore the obtained data structure into a Random-Access Memory (RAM) associated with the SSD memory device for assessing operational effectiveness of the SSD memory device based on the restored data structure.

The foregoing summary is illustrative only and is not intended to be in any way limiting. In addition to the illustrative aspects, embodiments, and features described above, further aspects, embodiments, and features may become apparent by reference to the drawings and the following detailed description.

Additional features and advantages are realized through the techniques of the present disclosure. Other embodiments and aspects of the disclosure are described in detail herein and are considered a part of the claimed disclosure.

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprise", "include" "comprising", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method, a Solid-State Drive (SSD) memory device (101) and a system for assessing operational effectiveness of the SSD memory device. Upon a failure of the SSD memory device, a command is executed which is received from a host device. The SSD memory device switches to an operational state after executing the command. A data structure having SSD operational parameters is obtained from a plurality of data structures obtained from the failure and stored in a Read Only Memory (ROM) upon the SSD memory device switching to the operational state. The obtained data structure is restored into a Random-Access Memory (RAM) for assessing operational effectiveness of the SSD based on the restored data structure. Thereby, the SSD operational parameters accumulated by the SSD memory device before the failure of the SSD memory device (101) can be retrieved. Hence, the required SSD operational parameters are recovered to continue the testing operation from the operational state. Thereby, the assessment of the operational effectiveness of the SSD memory device is improved.

FIG. 1 shows an exemplary environment (100) for assessing operational effectiveness of a solid-state drive (SSD) memory device (101), in accordance with some embodiments of the present disclosure. For example, the exemplary environment (100) comprises the SSD memory device (101) and a host device (105). The host device (105) may be a laptop computer, a desktop computer, a Personal Computer (PC), and the like. The SSD memory device (101) is a storage device. In an embodiment, the SSD memory device (101) and the host device (105) may be embedded into a single system (107). The system (107) may be a smart phone, a laptop, a computer, and the like. In another embodiment, the SSD memory device (101) and the host device (105) are stand-alone devices and are communicatively and/or electrically connected via connections as known in the art. For example, the connections may include using components such as pin(s), line(s), and bus(es). The line(s) may include a command line (106). The SSD memory device (101) comprises a connectivity port conforming to a Peripheral Component Interconnect Express (PCIe).

The host device (105) may include a host processor (not shown in FIG. 1), and a host memory (not shown in FIG. 1). The host processor may be implemented as a general-purpose processor, a dedicated processor, an application processor, and the like. Additionally, a host-resident operating system (OS) or firmware (not shown) or a Virtual Machine (VM) may be used by the host processor to provide command/control signals to the SSD memory device (101). In an embodiment, the host processor may be configured to transmit one or more commands to the SSD memory device (101) via the command line (106). The command may be vendor specific commands which is specific to memory device architecture.

The SSD memory device (101) may include a memory controller (102), a Random-Access Memory (RAM) (104), a Read Only Memory (ROM) (103), and a NAND flash memory (108). The RAM (104) may be a Static Random-Access Memory (SRAM), or a Dynamic RAM (DRAM) and the like. The ROM (103) may be an on-chip memory. The ROM (103) may be configured to store full dump of the SSD memory device (101). A full dump operation is performed by/in the SSD memory device (101) when the SSD memory device (101) encounters a failure. The full dump may include a plurality of data structures related to contents of the SSD memory device (101) when the memory device fails. The plurality of data structures may include different parameters of the SSD memory device (101) and different processes running in the SSD memory device (101) before the SSD memory device (101) failed. The SSD memory device (101) may stop unexpectedly due to error in firmware.

The memory controller (102) may be configured as a system-on-a-chip (SoC). Each function of the memory controller (102) may be realized by dedicated hardware, a processor executing a program (firmware), or a combination thereof. The memory controller (102) may execute the firmware to operate one or more components of the SSD memory device (101). The components of the SSD memory device (101) may include a memory device I/O interface block (not shown), peripheral devices, storage blocks, and the like. One or more operations of the components may include a boot operation, a read operation, a write operation, a debug operation, and so on. The memory device I/O interface block of the SSD memory device (101) may be coupled with the memory controller (102) through which an input signal such as the command is received by the SSD memory device (101) via the command line (106). As described above, the memory device I/O interface block may be the PCIe port. In an embodiment, the the SSD memory device (101) may be configured to execute the command received from the host device (105). When the SSD memory device (101) has failed, the full dump operation is performed to save/store the plurality of data structures in the ROM (103) of the SSD memory device (101). Further, the host device (105) provides the command to switch the SSD memory device (101) from a failed state to an operational state and restore a data structure from the plurality of data structures saved/stored in the ROM (103) after the SSD memory device (101) is switched to the operational state. The SSD memory device (101) is configured to obtain the data structure including SSD operational parameters from a plurality of data structures stored in the ROM (103) upon executing the command received from the host device (105). The SSD memory device (101) may be configured to restore the obtained data structure into the RAM (104) for assessing operational effectiveness of the SSD based on the restored data structure.

Figure 2:
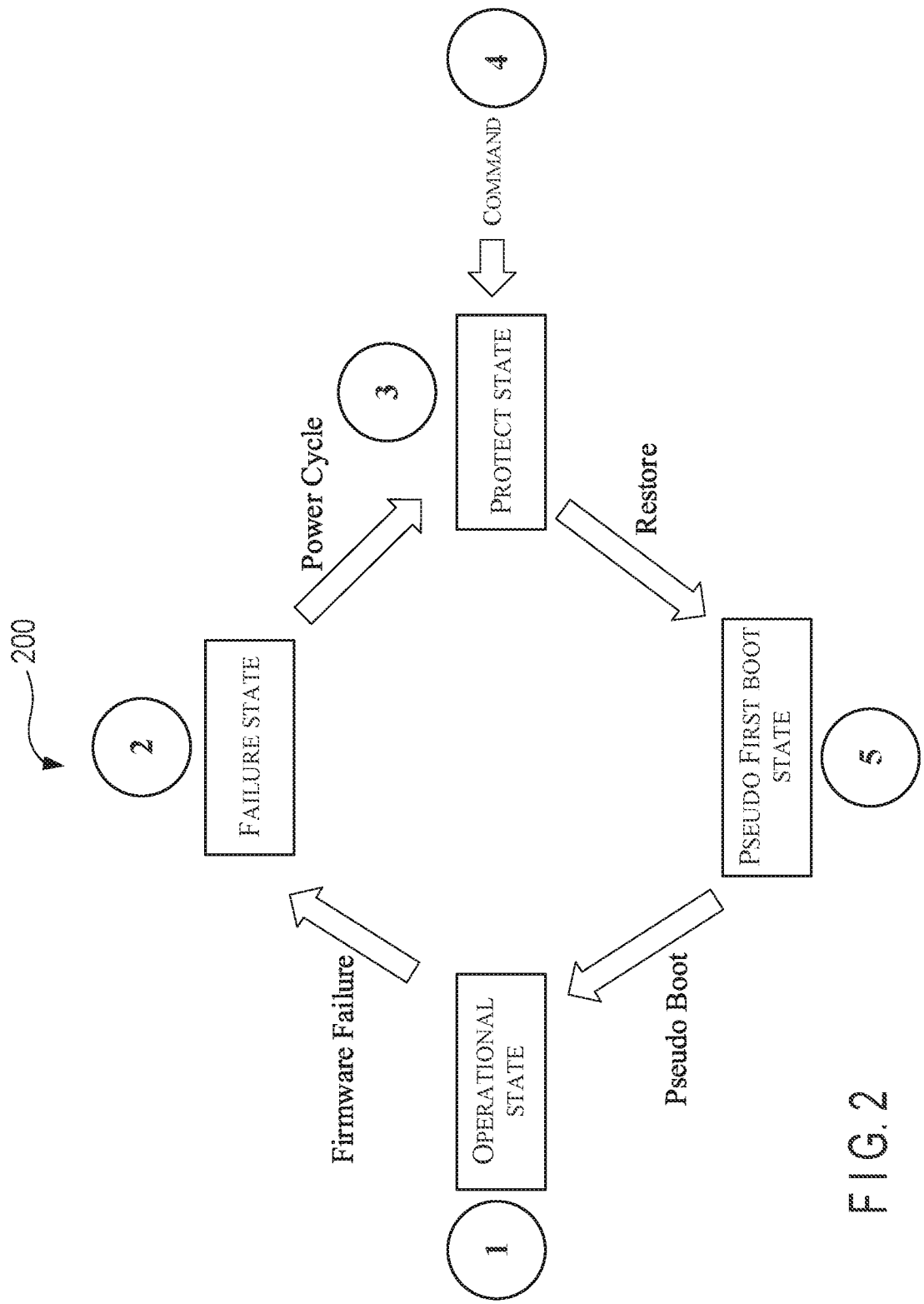
FIG. 2 shows a state flow diagram depicting a process for assessing operational effectiveness of the SSD memory device, in accordance with some embodiments of the present disclosure.

FIG. 2 shows a state flow diagram depicting a process for assessing operational effectiveness of a solid-state drive (SSD) memory device, in accordance with some embodiments of the present disclosure. At step 1: the SSD memory device (101) may be in an operational state. In an example scenario, consider the SSD memory device (101) may be connected to the host device (105) for testing. A tester may test the SSD memory device (101) to validate its operational effectiveness. During the testing process, the SSD memory device (101) may be in the operational state in which the tester may perform a read operation, a write operation, an erase operation, a debug operation, and the like. While being tested, the SSD memory device (101) may encounter unexpected error or bug in the firmware which may lead to firmware failure and subsequently the SSD memory device (101) may enter into a failure state as shown in step 2. At step 3: when the SSD memory device (101) fails and enters into a protect state (i.e., protect state ON), the plurality of data structures related to processes running in the SSD memory device (101) are loaded or dumped (i.e., full dump) to the ROM (103). In an embodiment, the command for the full dump operation may be stored in the ROM (103). Once the SSD memory device (101) enters the protect state, the tester may not be able to perform memory operations (e.g., read/write/erase) after failure of the SSD memory device (101). At Step 4: upon detecting the failure of the SSD memory device (101), the host device (105) is configured to transmit the command to the SSD memory device (101) for switching the SSD memory device (101) from the protect state to the operational state. Upon executing the received command from the host device (105), the SSD memory device (101) switches back to the operational state. The operational state indicates a state where the tester can perform read and write operations, on the SSD memory device (101). During the execution of the command, the command sets one or more flags in the firmware associated with the SSD memory device (101). The flags may be a 'recovery from protect state flag' and a 'first boot flag'. Upon setting the recovery from protect state flag, the SSD memory device (101) switches from the protected state to the operational state by initiating booting (i.e., Pseudo booting). Further upon setting the first boot flag in the SSD memory device (101), the memory controller (102) may be configured to restore the data structure including the SSD operational parameters from the ROM (103) to the RAM (104) as shown in step 5. Referring back to step 3, when the SSD memory device (101) fails during testing and enters into the protect state (i.e., protect state ON), in the protect state the plurality of data structures related to the processes running in SSD memory device (101) are loaded or dumped (i.e., full dump) to the ROM (103). The full dump is generally used for analysis of failure. Upon receiving the command at step 4, the SSD memory device (101) may be configured to boot the firmware and restore only the data structure including the SSD operational parameters in the RAM (104) from the plurality of data structures stored in the ROM (103) to assess the operational effectiveness of the SSD memory device (101). The data structure having SSD operational parameters may be required for assessing the effectiveness of the SSD memory device (101). The data structure is obtained from the ROM (103) and restored into the RAM (104) of the SSD memory device (101). The data structure including the SSD operational parameters. For example, consider one of the SSD operational parameters is P/E cycle information. Once the P/E cycle information is restored, the testing can be continued using the restored P/E cycle information. After restoring the P/E cycle information, the tester can have detailed information about past P/E cycle operations performed before the failure of the SSD memory device (101). Based on the restored P/E cycle information, the assessment of the operational effectiveness of the SSD memory device (101) may be improved. In another example, consider P/E cycle information is not restored back to the RAM (104), when the SSD memory device (101) switches to the operational state from the failure state. In such a case, the testing is to be continued with fresh P/E cycle information. By this, the assessment of the operational effectiveness of the SSD memory device (101) may be inaccurate because the P/E cycle operations performed before the failure is not considered. Thus, the assessment of the operational effectiveness of the SSD memory device (101) may be hampered.

Figure 3:
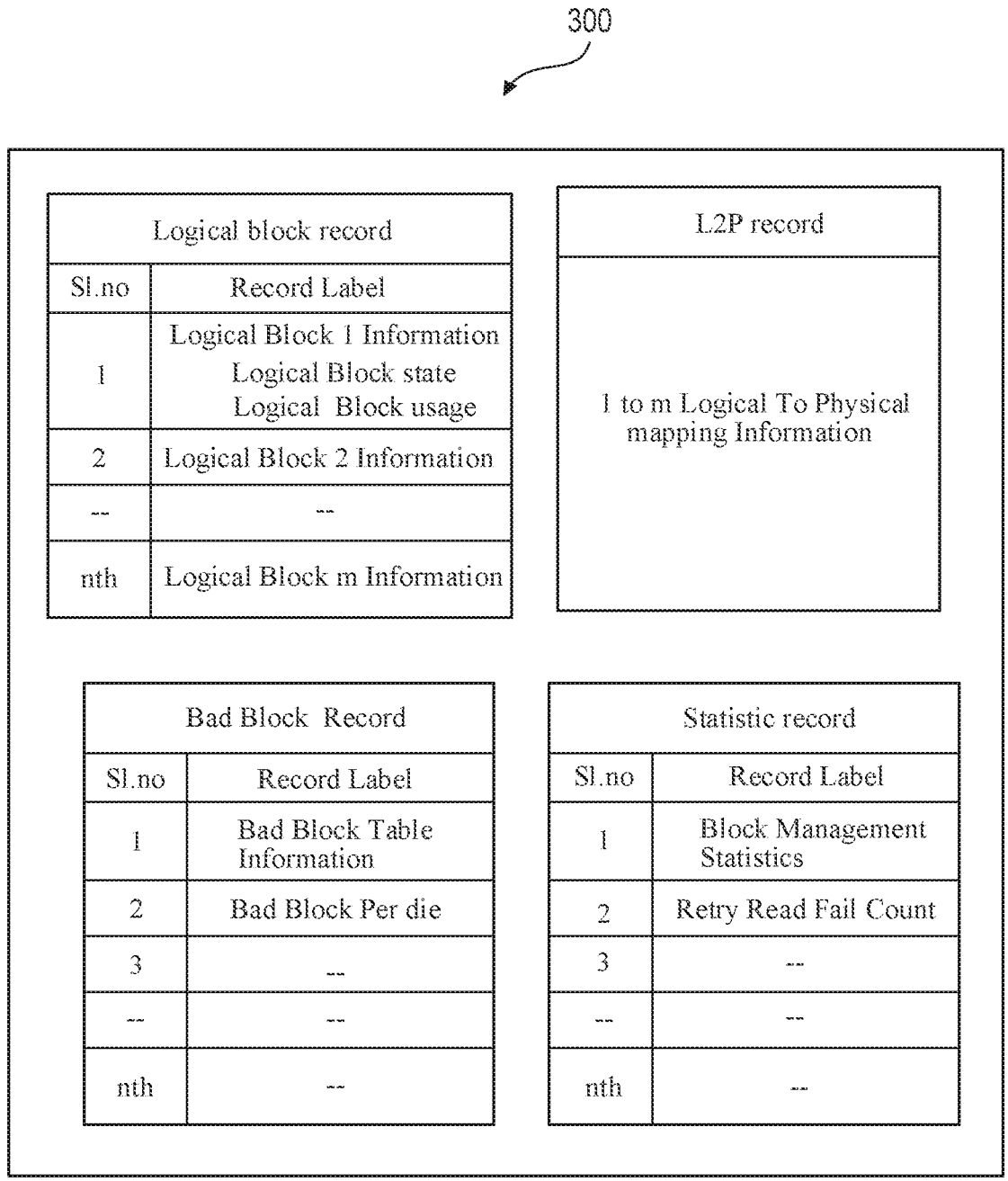
FIG. 3 illustrates an exemplary representation of the SSD operational parameters for assessing operational effectiveness of the SSD memory device, in accordance with some embodiments of the present disclosure.

FIG. 3 illustrates an exemplary representation of the SSD operational parameters for assessing operational effectiveness of the SSD memory device (101), in accordance with some embodiments of the present disclosure. When the SSD memory device (101) executes the command, then the SSD memory device (101) obtains the data structure including the SSD operational parameters from the plurality of data structures. The SSD operational parameters may include at least one of a logical block record, a Logical-to-Physical (L2P) mapping record, a bad block record and a statistic record. In an embodiment, the command may indicate to save and restore additional parameters apart from the above mentioned parameters (i.e., SSD operational parameters) in order to obtain additional records based on requirement of the tester to assess the effectiveness of the SSD memory device (101). For example, the command format may be depicted as follows, "nvme admin-passthru/dev/nvme0—opcode=0xE3— cdw10=1—input- file=RecoverProtectMode.bin—write—data- len=0x200".

Format of the command is only an example and should not be considered as a limitation. The command format may be dependent on memory device architecture. The SSD operational parameters may be the parameters required for assessing the operational effectiveness of the SSD memory device (101). The SSD memory device (101) may include 'm' logical blocks. For example, 'm' may be an integer number such as 16, 32, 64, and the like. The logical block record associated with the SSD memory device (101) may include each of the n logical blocks information. Each logical block information may include a logical block state, a logical block usage, and the like. The bad block record may include bad block table information, a bad block per die, and the like. The bad block table information may include the number of bad block entries. The bad block per die may indicate the number of bad blocks present in each of the 'm' dies. The L2P record may include each of the m logical to physical mapping information. Further, the statistic record may include block management statistics, retry read fail count, and the like. In overall, the statistic record depicts all statics information related to the SSD memory device (101) such as the number of read counts, the number of read fail counts, the number of write counts, the number of bad block counts, a total logical block count, a defect-free logical block count, and so on. Each record (e.g., the logical block record, the L2P mapping record, the bad block record, and the statistic record) further may include 'n' number of sub-records (i.e., from 1 to $n^{th}$ items) which is illustrated in FIG. 3 as an example and should not be considered as a limitation. For example, 'n' may be any integer number such as 10, 20, 30, and the like. In an embodiment, logical super blocks can be specified such that each logical super block capable of storing block information of individual physical blocks from different planes in the SSD memory device (101). The data structure may be obtained from the logical superblocks.

Figure 4:
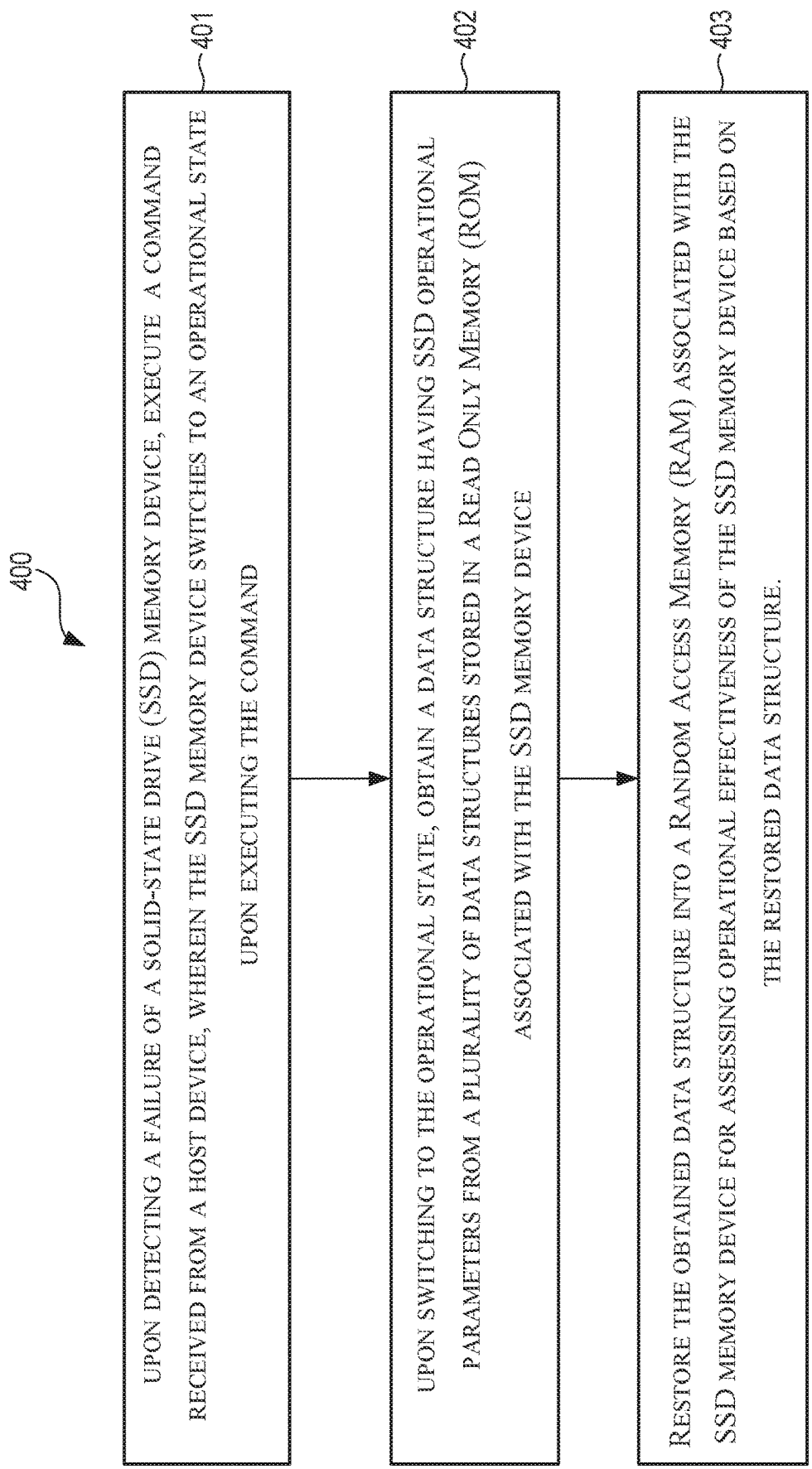
FIG. 4 shows a flowchart illustrating method for assessing operational effectiveness of the SSD memory device, in accordance with some embodiments of the present disclosure.

FIG. 4 shows a flowchart illustrating method for assessing operational effectiveness of the SSD memory device (101), in accordance with some embodiments of the present disclosure. The method steps are performed using or in the SSD memory device (101). The order in which the method (400) may be described is not intended to be construed as a limitation, and any number of the described method steps may be combined in any order to implement the method. Additionally, individual steps may be deleted from the method without departing from the spirit and scope of the subject matter described herein. Furthermore, the method may be implemented in any suitable hardware, software, firmware, or a combination thereof.

At step 401, the SSD memory device (101), executes the command (e.g., the command for the full dump operation as illustrated with reference to FIG. 2) received from the host device (105). The host device (105) transmits the command to the SSD memory device (101) via the command line (106). After executing the received command, the SSD memory device (101) is re-booted and switches to the operational state. The SSD memory device (101) is switched to the operational state from the failure state after the re-boot. In the failure state, the memory operations (e.g., read/write/erase) cannot be performed. Further, the execution of the command comprises setting of one or more flags associated with the firmware of the SSD memory device (101). The one or more flags may include the first boot flag and the recovery from protect state flag.

At step 402, the SSD memory device (101) obtains the data structure including the SSD operational parameters from the plurality of data structures stored in the ROM (103) associated with the SSD memory device (101), upon switching to the operational state. The SSD operational parameters comprises at least one of the logical block record, the Logical-to-Physical (L2P) mapping record, the bad block record, and the statistic record. The SSD memory device (101) identifies one or more records related to the SSD operational parameters in the ROM (103). The data structure which is required according to the command is generated based on the identified one or more records. Referring again to FIG. 3, considering that the logical block record, the L2P record, the bad block record and the statistic record are required as per the command provided by the host device (105). The SSD memory device (101) identifies the logical block record, the L2P record, the bad block record, and the statistic record in the ROM (103) and generates the data structure from the above one or more records. Once the data structure is generated, it is obtained from the ROM (103) after re-booting the SSD. In another embodiment, additional parameters may be incorporated in the command in order to obtain additional SSD operational parameters based on testing requirements to assess the effectiveness of the SSD memory device (101).

At step 403, the SSD memory device (101) restores the obtained data structure into the RAM (104) associated with the SSD memory device (101) for assessing operational effectiveness of the SSD memory device (101) based on the restored data structure. In an example scenario, consider the SSD memory device (101) has failed due to error in the firmware while performing testing. Once the SSD memory device (101) has failed, it switches to the protect state. In the protect state, the memory operations cannot be performed. Thereby, vital data related to the testing which was performed before the failure of the SSD memory device (101) is lost in conventional systems. Thus, it is difficult to assess the effectiveness of the SSD memory device (101) in the conventional systems. Referring to step 4 and step 5 of FIG. 2, the host device (105) transmits the command to the SSD memory device (101). The command is executed by the SSD memory device (101) to restore the SSD operational parameters. During the execution of the command, the flags such as the first boot flag and the recovery from protect state flag may be set. When the first boot flag is set, then, the firmware boots as the first boot and the SSD memory device (101) is set into the operational state and configured to perform read and write operations. When the recovery from protect state flag is set, then the memory controller (102) is configured to restore the SSD operational parameters from the ROM (103) to the RAM (104). The testing can be continued using the restored SSD operational parameters. Thus, the assessment of the SSD memory device (101) is accurate as the testing is performed considering the SSD operational parameters obtained before the failure of the SSD memory device (101). The implementation of the command is easy and firmware changes are less complex. As the full dump operation is performed in existing SSD memory devices, the data captured in the full dump operation is used by the present disclosure to restore the required parameters. A dedicated dump operation may not be required to restore the required parameters. In an embodiment, the SSD operational parameters may not be captured in certain conditions such as boot issues and power loss protection failure. To address the above issue, the required SSD operational parameters may be saved at regular time intervals.

Computer System

Figure 5:
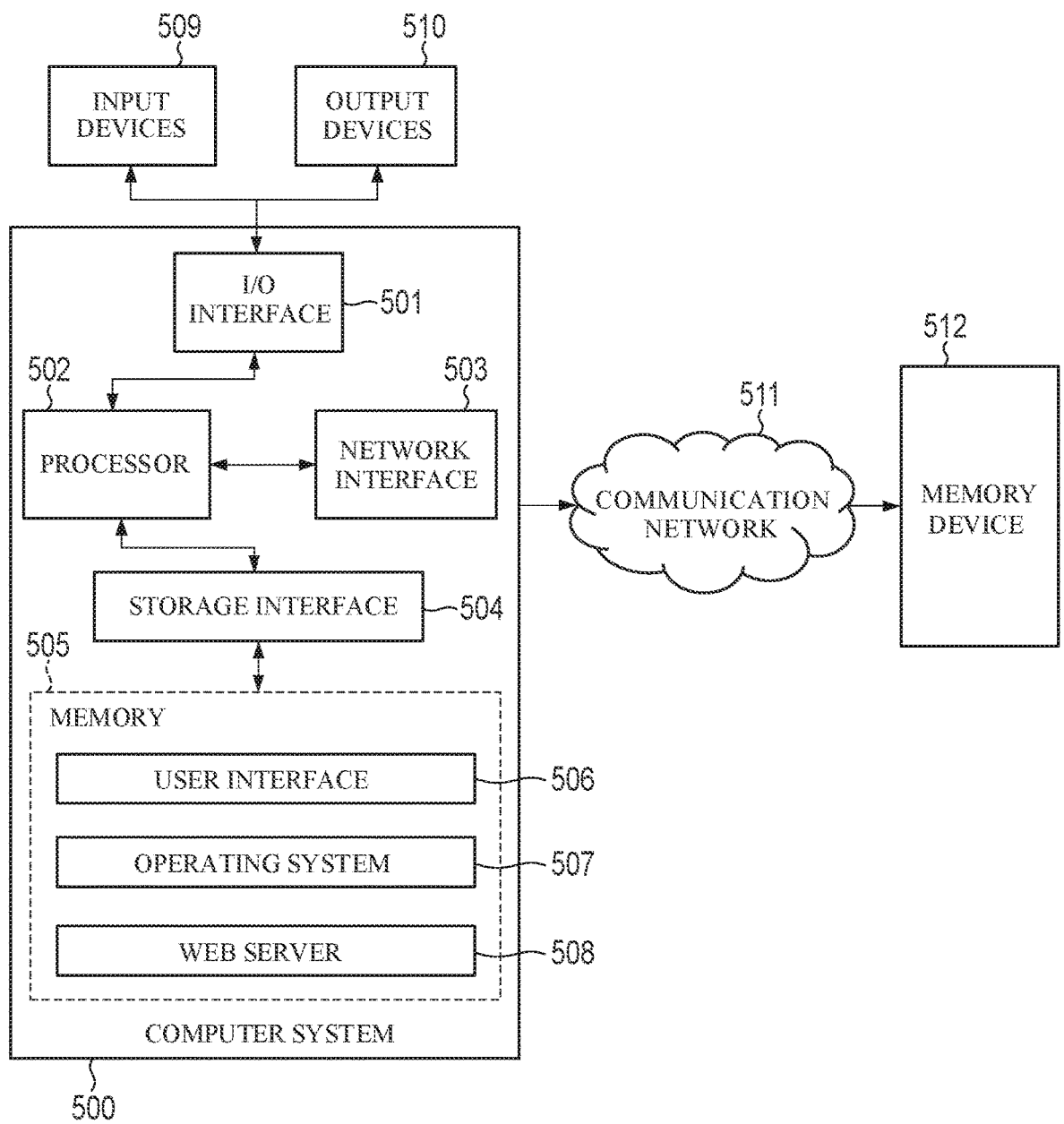
FIG. 5 shows a general-purpose computer system for assessing operational effectiveness of the SSD memory device, in accordance with embodiments of the present disclosure.

FIG. 5 shows a general-purpose computer system for assessing operational effectiveness of the SSD memory device, in accordance with embodiments of the present disclosure. In an embodiment, the computer system (500) may be used for providing a command to an SSD memory device (512) via a communication network (511) for assessing operational effectiveness of the SSD memory device. The computer system (500) may comprise a central processing unit ("CPU" or "processor") (502). The processor (502) may comprise at least one data processor for executing program components for dynamic resource allocation at run time. The processor (502) may include specialized processing units such as integrated system (bus) controllers, memory management control units, floating point units, graphics processing units, digital signal processing units, etc.

The processor (502) may be disposed in communication with one or more input/output (I/O) devices (not shown) via an I/O interface (501). The I/O interface (501) may employ communication protocols/methods such as, without limitation, audio, analog, digital, monoaural, RCA, stereo, IEEE-(1394), serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (501), the computer system (500) may communicate with one or more I/O devices. For example, the input device (509) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (510) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (500) is connected to a service operator through a communication network (511). The processor (502) may be disposed in communication with the communication network (511) via a network interface (503). The network interface (503) may communicate with the communication network (511). The network interface (503) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (511) may include, without limitation, a direct interconnection, e-commerce network, a peer to peer (P2P) network, local area network (LAN), wide area network (WAN), wireless network (e.g., using Wireless Application Protocol), the Internet, Wi-Fi, Ultra-Wide Band etc. Using the network interface (503) and the communication network (511), the computer system (500) may communicate with the SSD memory device (512).

In some embodiments, the processor (502) may be disposed in communication with a memory (505) (e.g., RAM, ROM, etc., not shown in FIG. 5) via a storage interface (504). The storage interface (504) may connect to the memory (505) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (505) may store a collection of program or database components, including, without limitation, a user interface (506), an operating system (507), a web server (508) etc. In some embodiments, the computer system (500) may store user/application data, such as the data, variables, records, etc., as described in this disclosure. Such databases may be implemented as fault-tolerant, relational, scalable, secure databases such as Oracle or Sybase.

The operating system (507) may facilitate resource management and operation of the computer system (500). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (500) may implement a web browser (not shown in FIG. 5) stored program component. The web browser may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (508) may utilize facilities such as AJAX, DHTML, ADOBE® FLASH®, JAVASCRIPT®, JAVA®, Application Programming Interfaces (APIs), etc. In some embodiments, the computer system (500) may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (500) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory (505) on which information or data readable by a processor (502) may be stored. Thus, a computer-readable storage medium may store instructions for execution by one or more processors, including instructions for causing the processors to perform steps or stages consistent with the embodiments described herein. The term "computer-readable medium" should be understood to include tangible items and exclude carrier waves and transient signals, i.e., non-transitory. Examples include Random Access memory (RAM), Read-Only memory (ROM), volatile memory, non-volatile memory, hard drives, Compact Disc (CD) ROMs, Digital Video Disc (DVDs), flash drives, disks, and any other known physical storage media.

In an embodiment, the computer system (500) may send the command to the SSD memory device (512) via the communication network (511) upon a failure of the SSD memory device (512). Upon receiving the command from the computer system (505), the SSD memory device (512) executes the command. The SSD memory device (512) switches to the operational state after executing the command. Upon the SSD memory device (512) switching to the operational state, a data structure having SSD operational parameters is obtained from a plurality of data structures obtained before the failure and stored in a Read Only Memory (ROM) (not shown in FIG. 5) associated with the SSD memory device (512). The obtained data structure is restored into a Random Access Memory (RAM) (not shown in FIG. 5) associated with the SSD memory device (512) for assessing operational effectiveness of the SSD memory device (512) based on the restored data structure.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

While certain embodiments have been described, these embodiments have been presented by way of example only, and are not intended to limit the scope of the inventions. Indeed, the novel devices and methods described herein may be embodied in a variety of other forms; furthermore, various omissions, substitutions, and changes in the form of the embodiments described herein may be made without departing from the spirit of the inventions. The accompanying claims and their equivalents are intended to cover such forms or modification as would fall within the scope of the inventions.

What is claimed is:

1. A method of operating a solid-state drive (SSD) memory device, the method comprises:
   in response to a failure of the SSD memory device due to an error of a firmware of the SSD memory device, changing a state of the SSD memory device from an operational state to a failure state where the SSD memory device cannot perform memory operations, and storing a plurality of data structures in a Read Only Memory (ROM) of the SSD memory device, the plurality of data structures each having SSD operational parameters, the SSD operational parameters including at least vital information of a NAND flash memory of the SSD memory device before the failure;

in response to receiving a command received from a host device, re-booting the SSD memory device;

after re-booting the SSD memory device, changing the state of the SSD memory device back to the operational state where the SSD memory device can perform the memory operations;

after changing the state of the SSD memory device to the operational state, obtaining a first data structure from the plurality of data structures stored in the ROM;

restoring the vital information of the NAND flash memory before the failure from the first data structure; and performing the memory operations considering the vital information before the failure which has been restored after the re-booting of the SSD memory device.

2. The method of claim 1, wherein the SSD operational parameters further comprises at least one of a logical block record, a Logical-to-Physical (L2P) mapping record, a bad block record and a statistic record.

3. The method of claim 1, wherein the obtaining of the first data structure comprises:

identifying one or more records related to the SSD operational parameters; and obtaining the first data structure based on the identified one or more records.

4. The method of claim 1, further comprising:

in response to the command, setting one or more flags associated with the firmware of the SSD memory device.

5. A solid-state drive (SSD) memory device comprising:

a memory controller;

a Read Only Memory (ROM); and a NAND flash memory, wherein the memory controller is configured to:

in response to a failure of the SSD memory device due to an error of a firmware of the SSD memory device, change a state of the SSD memory device from an operational state to a failure state where the SSD memory device cannot perform memory operations, and store a plurality of data structures in the ROM, the plurality of data structures each having SSD operational parameters, the SSD operational parameters including at least vital information of the NAND flash memory before the failure;

in response to receiving a command from a host device, re-boot the SSD memory device;

after re-booting the SSD memory device, change the state of the SSD memory device back to the operational state where the SSD memory device can perform the memory operations;

after changing the state of the SSD memory device to the operational state, obtain a first data structure from the plurality of data structures stored in the ROM;

restore the vital information of the NAND flash memory before the failure from the first data structure; and perform the memory operations considering the vital information before the failure which has been restored after the re-booting of the SSD memory device.

6. The SSD memory device of claim 5, wherein the SSD operational parameters further comprises at least one of a logical block record, a Logical-to-Physical (L2P) mapping record, a bad block record and a statistic record.

7. The SSD memory device of claim 5, wherein the memory controller is configured to obtain the first data structure by:

identifying one or more records related to the SSD operational parameters; and obtaining the first data structure based on the identified one or more records.

8. The SSD memory device of claim 5, wherein the memory controller is further configured to:

in response to the command, set one or more flags associated with the firmware of the SSD memory device.

9. A system comprising:

a solid-state drive (SSD) memory device; and a host device configured to send a command to the SSD memory device, wherein the SSD memory device is configured to:

in response to a failure of the SSD memory device due to an error of a firmware of the SSD memory device, change a state of the SSD memory device from an operational state to a failure state where the SSD memory device cannot perform memory operations, and store a plurality of data structures in a Read Only Memory (ROM) of the SSD memory device, the plurality of data structures each having SSD operational parameters, the SSD operational parameters including at least vital information of a NAND flash memory of the SSD memory device before the failure;

in response to receiving a command from the host device, re-boot the SSD memory device;

after re-booting the SSD memory device, change the state of the SSD memory device back to the operational state where the SSD memory device can perform the memory operations;

after changing the state of the SSD memory device to the operational state, obtain a first data structure from the plurality of data structures stored in the ROM;

restore the vital information of the NAND flash memory before the failure from the first data structure; and perform the memory operations considering the vital information before the failure which has been restored after the re-booting of the SSD memory device.

10. The system of claim 9, wherein the SSD operational parameters further comprises at least one of a logical block record, a Logical-to-Physical (L2P) mapping record, a bad block record and a statistic record.

11. The system of claim 9, wherein the SSD memory device is configured to obtain the first data structure by:

identifying one or more records related to the SSD operational parameters; and obtaining the first data structure based on the identified one or more records.

12. The system of claim 9, wherein the the SSD memory device is further configured to:

in response to the command, set one or more flags associated with the firmware of the SSD memory device.

13. The method of claim 1, wherein the vital information of the NAND flash memory includes program/erase cycles of the NAND flash memory of the SSD memory device.

14. The SSD memory device of claim 5, wherein the vital information of the NAND flash memory includes program/erase cycles of the NAND flash memory of the SSD memory device.

15. The system of claim 9, wherein the vital information of the NAND flash memory includes program/erase cycles of the NAND flash memory of the SSD memory device.

\* \* \* \* \*